July 22, 1952 H. G. DIBELKA 2,604,560
DIRECTIONAL SIGNAL SWITCH

Filed June 23, 1950 2 SHEETS—SHEET 1

Henry G. Dibelka,
Inventor,
Haynes and Koenig,
Attorneys.

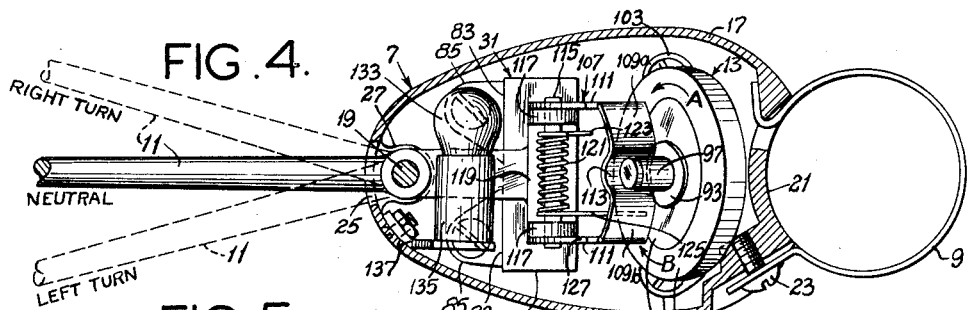

Patented July 22, 1952

2,604,560

UNITED STATES PATENT OFFICE 2,604,560

DIRECTIONAL SIGNAL SWITCH

Henry G. Dibelka, Chicago, Ill., assignor to Auto Lamp Manufacturing Co., Chicago, Ill., a partnership Application June 23, 1950, Serial No. 169,986

22 Claims. (Cl. 200—59)

This invention relates to directional signal switches for use in turn-indicating signalling systems for vehicles, and more particularly to "automatically-resetting" or "self-cancelling" switches of this class.

The object of the invention is the provision of an improved "automatically-resetting" or "self-cancelling" directional signal switch for use in turn-indicating signalling systems for vehicles, which may be economically manufactured and readily installed, without requiring any alteration of vehicle structure, and which is reliable and trouble-free in operation. By "automatically-resetting" or "self-cancelling" is meant a type of switch wherein a switch-operating member is manually moved from a neutral position to a right turn position or to a left turn position to cause operation of a right turn indicator or a left turn indicator, respectively, and wherein the operating member automatically returns to its neutral position in response to turning of the vehicle.

A directional signal switch of this invention is used in conjunction with a rotary steering member, such as the usual steering wheel of a vehicle (though not limited thereto), and, in general, comprises a switch-operating member mounted for manual movement from a neutral position either to a right turn or a left turn position selectively to close either right turn or left turn contacts. The switch-operating member is latched in either of its right or left turn positions, and remains latched despite turning of the steering member to make the signalled turn. The switch includes a gear mounted for rotation on a fixed axis and adapted, upon mounting the switch in fixed position adjacent the steering member, for engagement with the steering member to be driven thereby, with the arrangement such that when the steering member returns to its neutral position upon completion of the turn, it drives the switch-operating member back to its neutral position. Other features will be in part apparent and in part pointed out hereinafter.

The invention accordingly comprises the elements and combinations of the elements, features of construction, and arrangement of parts which will be exemplified in the structures hereinafter described, and the scope of the application of which will be indicated in the following claims.

In the accompanying drawings, in which one of various possible embodiments of the invention is illustrated, Fig. 1 is a view in elevation showing a switch of this invention as attached to a conventional steering column of a vehicle under and cooperating with the steering wheel of the vehicle, for example, as viewed in an automobile from behind and below the steering wheel;

Fig. 4 is a section taken on line 4—4 of Fig. 1;

Fig. 5 is an enlarged side elevation of an element of the switch;

Fig. 6 is a section taken on line 6—6 of Fig. 5;

Fig. 7 is a plan view of Fig. 6;

Figure 1:
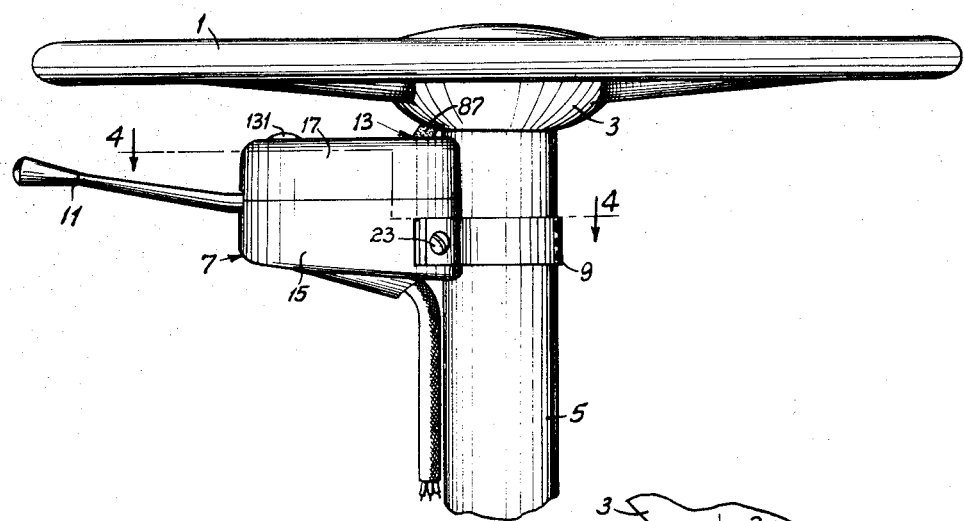

Fig. 8 is an enlarged central longitudinal vertical section of a switch unit forming a part of the switch; and, Figs. 9, 10, 11 and 12 are sections taken respectively on lines 9—9, 10—10, 11—11 and 12—12 of Fig. 8.

Similar reference characters indicate corresponding parts throughout the several views of the drawing.

Referring to the drawings, there is shown at 1 in Fig. 1 a conventional vehicle steering wheel. This has a hub 3 rotary at the upper end of a fixed steering column 5, it being understood that the hub is fixed to a steering rod (not shown) extending through the column 5. Mounted on the steering column just under the steering wheel is a switch of this invention, which includes a support in the form of a housing 7 fixed upon the steering column by an encircling strap 9. Projecting from the housing 7 are a manual switch-operating lever member 11 and a friction gear member or wheel 13. The housing is fixed to the steering column with the wheel 13 in permanent engagement with the rounded surface of the steering wheel hub 3 adjacent the upper end of the steering column 5. It is preferred that the housing be mounted in a position wherein the member 11 extends from the steering column on the driver's left.

The lever member 11 is pivoted in the housing 7 for swinging movement on an axis parallel to the axis of the steering wheel, and is adapted normally to occupy a neutral position from which it is manually movable in one direction or the other. Thus, the lever may be swung in one direction (clockwise as viewed from above) to a right turn position for signalling a right turn, or it may be swung in the opposite direction to a left turn position for signalling a left turn. Switch contacts are provided in the housing for actuation by the lever, and these contacts are adapted to control suitable circuits for selectively energizing right and left turn signal lights. Such circuits and signal lights are known in the art, hence are not shown.

As illustrated, the housing 7 is of a two-part construction, consisting of a cup-shaped base 15 and a cup-shaped cover 17, which are engaged rim-to-rim and held together by a threaded stud 19. Any suitable means may be provided to maintain the base and cover in alignment with each other. One end 21 of the housing is made concave so as to fit the steering column. The strap 9 for clamping the housing to the steering column is hooked at one end in an opening in the concaved end of the base 15 of the housing, and has its other end secured to the periphery of the base 15 by a screw 23. The opposite end of the housing is formed with an opening 25 for receiving the manual switch-operating lever member 11. This member is pivoted intermediate its ends on the stud 19 between a boss 27 on the base 15 and a boss 29 on the cover 17, having a part extending from the pivot into the housing and a handle part extending out of the housing.

Within the housing is mounted a switch unit, generally designated 31. The construction of this unit is detailed in Figs. 8–12, the unit, as shown, generally comprising a case 33 containing a pair of movable contact members 35 and 37 which are actuated upon movement of the lever 11. The case 33 is of elongate rectangular outline in plan and in end elevation (Fig. 12) is of approximately square outline. It has a top wall 39, side walls 41 and end walls 43. Its open bottom is closed by a bottom closure member 45 of insulating material, held in assembled relation with the metal case by tongues 47 formed as integral parts of the side walls of the case extending through notches 48 in the side edges of the closure member 45 and bent under the latter (see Figs. 11 and 12). Riveted in the closure member 45 are seven contacts generally designated 49, arranged as illustrated in Fig. 11.

Longitudinally slidable in the case are two blocks 51 and 53 of insulating material. These are biased away from one another by a compression spring 55 toward a neutral position wherein their outer ends engage the opposite end walls of the case. The two blocks are identical, their positions being reversed in assembly. Each block has a recess 57 in its inner end receiving the respective end of the spring 55. The contact member 35 is associated with block 51 and the contact member 37 is associated with block 53. Each contact member consists of a generally triangular contact plate having three contact bosses 59 arranged in a triangle. Each plate is accommodated in a recess 61 in the bottom of the respective block and has upwardly projecting tongues 63 slidable in vertical grooves 65 in the sides of each respective block (Fig. 12). Each plate is biased downward against the closure member by a compression spring 66 located in a recess 67 in the respective block. The faces of the contacts 49 are flush with the inside face of the closure member.

A metal plate or slide 69 is slidable longitudinally of the case 33 between the top surfaces of the blocks and the top 39 of the case. This plate carries a stud 71 which extends upward through an elongate longitudinal slot 73 in the top of the case. At its ends, the plate or slide 69 has downturned ears 75 which are received in horizontal grooves 77 in the sides of the block behind shoulders 79 on the block. When the two blocks are in their normal position at the ends of the case (Figs. 8–11), the shoulders 79 on both blocks engage the ears 75 at the ends of the slide 69. In this position of the blocks, the stud 71 is centered in a neutral position (Figs. 8 and 9). The contact plate 35 associated with the block 51 bridges certain of the contacts 49 when the block is in its neutral position. When the block 51 is moved to the right, as viewed in Figs. 8–10, the contact plate 35 associated therewith bridges certain others of the contacts, as indicated in Fig. 11. In a like manner, the contact plate 37 associated with the block 53 normally engages certain contacts 49 when in neutral position and is movable toward the center of the case to a position wherein it engages certain others of the contacts 49.

It will be understood that the contacts 49 are adapted to be connected in suitable signal light circuits (not shown). These circuits are such that when the contact plates 35 and 37 are in their neutral position, no turn signal is given, and when either movable contact plate is moved from its neutral position, a turn signal is given. Seven contacts are included so that the same signal lights may be used for turn indication and for stop warning indication in a manner known in the art, and not material to an understanding of this invention.

The inner end of the lever 11 inside the housing 7 is formed with a longitudinal groove 81 in its bottom. The switch unit 31 is mounted under the inner end portion of the lever with the stud 71 extending into the groove 81. The unit 31 is carried by a bracket 83 mounted on posts 85 which extend upward from the bottom of the base 15 of the housing. The bracket has a slot coextensive with the slot 73. The arrangement is such that when the two blocks 51 and 53 are in their neutral end positions, and stud 71 is centered (Figs. 8–10), the lever 11 occupies the neutral position shown in solid lines in Fig. 4. When the lever is swung clockwise from its neutral position as viewed in Fig. 4 to the upper dotted-line position illustrated, which is its right turn position, it moves the stud 71 to the left as viewed in Figs. 9 and 10, thereby moving the block 53 and the associated contact plate 37 to the left to complete a left turn signal circuit. This compresses spring 55. When the lever is swung counterclockwise from its neutral position as viewed in Fig. 4 to the lower dotted-line position illustrated, which is its left turn position, it moves the stud 71 to the right as viewed in Figs. 9 and 10, thereby moving the block 51 and the associated contact plate 35 to the right to complete a right turn signal circuit (see Fig. 11). This also compresses the spring 55.

The friction wheel 13, as illustrated, comprises a ring 87 of resilient material held between collars 89 and 91 riveted on the ends of a sleeve 93. The sleeve is press-fitted on a hub 95. The hub has an extension 97 which is utilized as a friction pinion. The wheel and extension 97 form a friction gear cluster. The hub 95 is journalled on a stud 99, one end of which is riveted in a bracket 101 mounted on posts 103 which extend upward from the bottom of the base 15 of the housing. The stud extends from the bracket toward the inner end of the lever 11 in a plane corresponding to the neutral plane of the lever. As illustrated, the stud is angled upward from the bracket so as to mount the friction wheel 13 in a plane at least approximately normal to the rounded lower surface of the steering wheel hub 3 at a point closely adjacent the steering column 5 (see Fig. 2). The friction wheel 13 projects through an opening 105 in the top of the housing 7 for engagement with the steering wheel hub. In mounting the housing 7 on the steering column 5, the housing may be located on the column with the friction wheel in engagement with the hub 3 simply by sliding it upward on the column.

The lever 11 carries an interrupted friction gear member, generally designated 107, cooperable with the extension or friction pinion 97. The gear member 107 comprises a ring segment 109 having parallel flat side arms 111. The ring segment is arcuate in plan (see Fig. 7) on an arc centered in the axis of the lever 11, and flat except for a depression 113 at its center providing an interruption (see Fig. 6). The gear member 107 is mounted on the inner end of the lever 11 for pivotal movement about an axis extending transversely to the length of the lever by means of a pivot pin 115 mounted in upstanding lugs 117 on a cross arm 119 at the inner end of the lever, the pin extending through openings in the free ends of the side arms 111. The gear member 107 extends from the inner end of lever 11 toward the friction wheel 13 with its ring segment 109 under the pinion 97. The depression or interruption 113 is longitudinally aligned with the lever (see Fig. 4). The gear member is biased to swing upward by means of a torsion spring 121 surrounding the pivot pin 111 having one end 123 reacting against the cross arm 119 and its other end 125 reaching out under the ring segment 109.

The side arms 111 of the friction gear member 107 are formed with upwardly projecting ears 127 engageable with a stop consisting of a bead 129 formed on the inside of the top of the cover 17 of the housing 7 for limiting the upward swing of member 107 in such manner that when the lever 11 is in its neutral position, with pinion 97 in the depression or interruption 113, contact between the member 107 and the pinion 97 is broken. See Fig. 2, from which it will be seen that pinion 97 is out of contact with the central depressed or interrupted part 113 of member 107, part 113 being properly dimensioned in respect to pinion 97 to accomplish this. It will also be noted that when the member 107 is in its uppermost position, as determined by engagement of ears 127 with bead 129, the plane of member 107 is angled with respect to the axis of the stud 99 (see Fig. 2). The angle is such that member 107 may be swung down to a position wherein its upper surface is in a plane tangent to the periphery of the pinion 97 at the bottom of the pinion.

In the top of the cover 17 of the housing 7 is a window 131. A pilot lamp 133 is mounted in the housing under the window, the lamp being received in a socket 135 mounted on a bracket 137 secured in the housing. Wiring connections to the contacts 49 are generally indicated at 139 and extend out through an opening 141 in the bottom of the housing.

Figure 2:
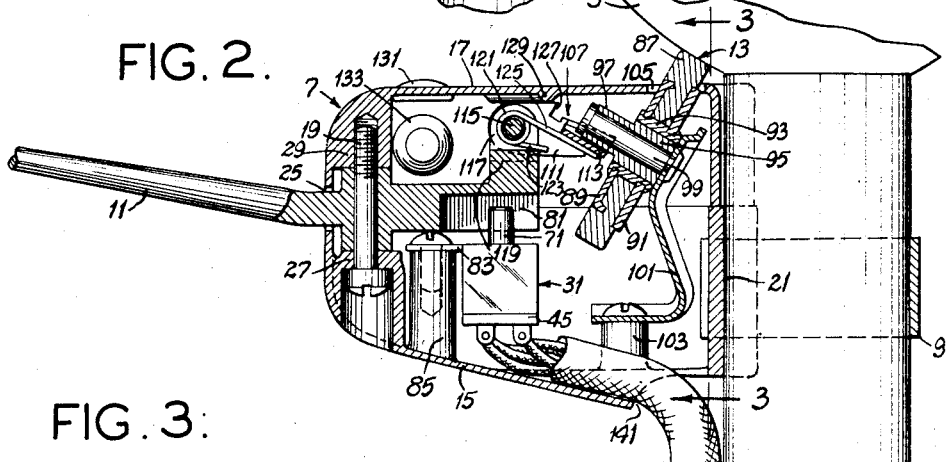
Fig. 2 is an enlarged central longitudinal vertical section of the switch illustrating portions of the steering wheel and the steering column.
Figure 3:
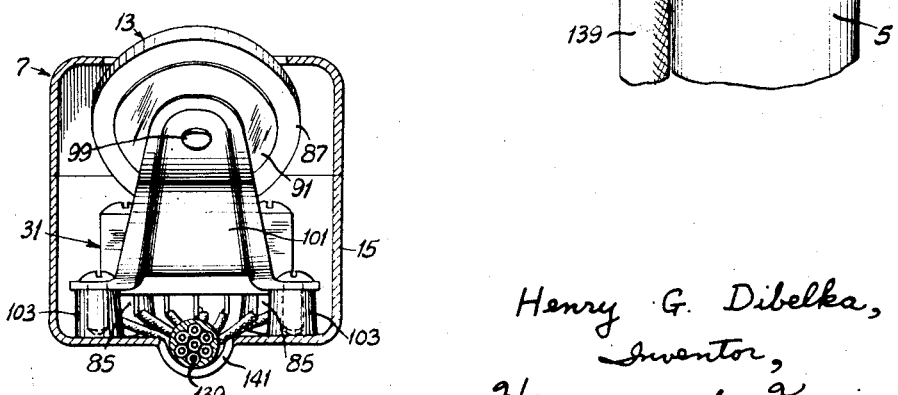
Fig. 3 is a section taken on line 3—3 of Fig. 2.

Operation is as follows:

With the support or housing 7 mounted on the steering column 5 in position for frictional engagement of the friction wheel 13 with the hub 3 of the steering wheel 1, as shown in Figs. 1 and 2, as the steering wheel is turned to make a right turn, the friction wheel is rotated in the direction of the arrow A as illustrated in Fig. 4. As the steering wheel returns to its neutral or straightaway position, the friction wheel is rotated in the direction of the arrow B as illustrated in Fig. 4. As the steering wheel is turned to make a left turn, the friction wheel is rotated in the direction of arrow B, and as the steering wheel returns to neutral, the friction wheel is rotated in the direction of the arrow A. Both the steering wheel and the friction wheel are on fixed axes relative to one another.

When a right turn signal is to be given, the driver swings the lever 11 clockwise from its neutral position to right turn position, thereby moving contact plate 37 as previously explained to close the right turn contacts. This swings the gear segment 109 clockwise as viewed in Fig. 4, and causes it to swing downward against the bias of spring 121, which maintains the portion 109a of gear segment 109 on one side of interruption 113 in frictional engagement with the friction pinion 97. Lever 11 is swung clockwise as far as permitted by the movement of the stud 71 and the block 37. It is held in this position against the bias of spring 55 by the latching action of the friction gearing. That is, portion 109a of gear segment 109 is in frictional engagement with pinion 97 and the latter is part of a cluster including friction wheel 13 which is in frictional engagement with the hub 3, the latter remaining stationary prior to making a turn. Consequently, although lever 11 is biased counterclockwise by the compressed spring 55, it does not return to its neutral position because the gear train is frictionally locked.

When the steering wheel is subsequently turned to make a right turn, it rotates or tends to rotate the friction wheel 13 and pinion 97 in the direction of the arrow A. It will be noted that this has the effect of tending to swing lever 11 further clockwise, but, since lever 11 is stopped against clockwise movement any further, slippage occurs in the gear train, either between 109a and 97, or between wheel 13 and the steering wheel hub 3, or both. However, when the steering wheel and hub 3 return to neutral position in coming out of the turn, the friction wheel and pinion 97 are driven in the direction of the arrow B, and this has the effect of driving the gear segment 109 and the lever 11 counterclockwise back to neutral position wherein segment 109 and pinion 97 are uncoupled by the interruption 113. Thus, the lever 11 is automatically returned to neutral position on coming out of the right turn.

When a left turn signal is to be given, the driver swings the lever counterclockwise from its neutral position to its left turn position, thereby moving the contact plate 35 as previously explained to close the left turn contacts. This swings the gear segment 109 counterclockwise as viewed in Fig. 4, and causes it to swing downward against the bias of spring 121, which maintains the portion 109b of gear segment 109 on the other side of interruption 113 from portion 109a in frictional engagement with the friction pinion 97. Lever 11 is swung counterclockwise as far as permitted by the movement of the stud 71 and the block 35. It is held in left turn position against the bias of spring 55 by the latching action of the friction gearing. That is, portion 109b of gear segment 109 is in frictional engagement with pinion 97 and the latter is part of a cluster including friction wheel 13 which is in frictional engagement with the hub 3, the latter remaining stationary prior to making the turn. Consequently, although lever 11 is biased clockwise by the compressed spring 55, it does not return to its neutral position because the gear train is frictionally locked.

When the steering wheel is subsequently turned to make the left turn, it rotates or tends to rotate the friction wheel 13 and pinion 97 in the direction of the arrow B. This has the effect of tending to swing lever 11 further counterclockwise, but since the lever is stopped against counterclockwise movement any further, slippage occurs in the gear train, either between 109b and 97, or between wheel 13 and hub 3, or both. However, when the steering wheel and hub 3 return to neutral position in coming out of the left turn, the friction wheel and pinion 97 are driven in the direction of arrow A, and this has the effect of driving the gear segment 109 and the lever 11 clockwise back to neutral position wherein the segment 109 and pinion 97 are uncoupled by the interruption 113. Thus, the lever 11 is automatically returned to neutral position on coming out of the left turn.

From the above, it will be seen that friction wheel or gear 13, friction pinion 97, and ring segment gear member 109 constitute a friction-slip gear train for coupling the hub 3 (as a rotary steering member) to the switch-operating member 11, the friction wheel or gear 13 being mounted for rotation on a fixed axis and, as used in conjunction with hub 3, being permanently in engagement therewith, the segment gear member 109 constituting an interrupted gear member with its interruption 113 so phased as to uncouple the gear 13 and the switch-operating member 11 when the latter is in neutral position.

It will be observed that if the switch-operating member 11 is moved either to right or left turn position, and it is desired manually to cancel the signal, this may be effected simply by manually moving the member 11 back to neutral position, this being permitted by slippage in the friction-slip gear train.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A directional signal switch for use in conjunction with a rotary steering member, comprising right and left turn contacts, a switch-operating member mounted for movement from a neutral position either to a right turn or left turn position selectively to close either the right or left turn contacts, a friction-slip gear train for coupling the rotary steering member and the switch-operating member, said train including a gear mounted for rotation on a fixed axis and adapted for engagement with the rotary steering member to be driven thereby, and also including an interrupted gear member having an interruption so phased as to uncouple the said gear and the switch-operating member when the latter is in neutral position.

2. A directional signal switch for use in conjunction with a rotary steering member, comprising right and left turn contacts, a switch-operating member mounted for movement from a neutral position either to a right turn or left turn position selectively to close either the right or left turn contacts, and a train of friction gears for coupling the rotary steering member and the switch-operating member, the train including a friction wheel mounted for rotation on a fixed axis and adapted for engagement with the rotary steering member to be driven thereby, and also including an interrupted friction gear member having an interruption so phased as to uncouple the friction wheel and switch-operating member when the latter is in neutral position.

3. A directional signal switch for use in conjunction with a rotary steering member, comprising right and left turn contacts, a switch-operating member mounted for movement from a neutral position either to a right turn or left turn position selectively to close either the right or left turn contacts, and a train of friction gears for coupling the rotary steering member and the switch-operating member, the train including a friction wheel mounted for rotation on a fixed axis and adapted for engagement with the rotary steering member to be driven thereby, a friction pinion rotary with the friction wheel, and an interrupted friction gear member carried by the switch-operating member for engagement with the pinion, the interrupted gear member having an interruption so phased as to uncouple the pinion and interrupted gear member when the switch-operating member is in neutral position, the pinion and interrupted gear member otherwise being frictionally engaged.

4. A directional signal switch as set forth in claim 3 wherein the interrupted friction gear member is carried by the switch-operating member for movement toward and away from the pinion and is biased toward the pinion.

5. A directional signal switch as set forth in claim 4, further including means for limiting the movement of the interrupted gear member toward the pinion to determine a position of said gear member, in the neutral position of the switch-operating member, out of contact with the pinion.

6. A directional signal switch for use in conjunction with a rotary steering member, comprising right and left turn contacts, a switch-operating lever pivoted for swinging movement in one direction from a neutral position to a right turn position and in the other direction from neutral to a left turn position for selectively closing either the right or left turn contacts, and a friction-slip gear train for coupling the rotary steering member and the lever including a gear mounted for rotation on a fixed axis and adapted for engagement with the rotary steering member to be driven thereby, and also including an interrupted gear member rotary with the lever having an interruption so phased as to uncouple the said gear and the lever when the lever is in neutral position.

7. A directional signal switch for use in conjunction with a rotary steering member, comprising right and left turn contacts, a switch-operating lever pivoted for swinging movement in one direction from a neutral position to a right turn position and in the other direction from neutral to a left turn position for selectively closing either the right or left turn contacts, and a train of friction gears for coupling the rotary steering member and the lever including a friction wheel mounted for rotation on a fixed axis and adapted for engagement with the rotary steering member to be driven thereby, and also including an interrupted friction gear member rotary with the lever having an interruption so phased as to uncouple the friction wheel and the lever when the lever is in neutral position.

8. A directional signal switch for use in conjunction with a rotary steering member, comprising right and left turn contacts, a switch-operating lever pivoted for swinging movement in one direction from a neutral position to a right turn position and in the other direction from neutral to a left turn position for selectively closing either the right or left turn contacts, and a train of friction gears for coupling the rotary steering member and the lever including a friction wheel mounted for rotation on a fixed axis and adapted for engagement with the rotary steering member to be driven thereby, a friction pinion rotary with the friction wheel, and an interrupted friction gear segment carried by the lever for engagement with the pinion, the gear segment having an interruption so phased as to uncouple the pinion and gear segment when the lever is in neutral position, the pinion and gear segment otherwise being frictionally engaged.

9. A directional signal switch as set forth in claim 8 wherein the gear segment is carried by the lever for movement toward and away from the pinion and is biased toward the pinion.

10. A directional signal switch as set forth in claim 9, further including means for limiting the movement of the gear segment toward the pinion to determine a position of the gear segment, in the neutral position of the lever, out of contact with the pinion.

11. A directional signal switch for mounting on a vehicle's steering column under the vehicle's steering wheel, comprising a housing having means for attaching it to the column, right and left turn contacts in the housing, a switch-operating lever pivotally mounted in the housing for swinging movement in one direction from a neutral position to a right turn position and in the opposite direction from neutral to a left turn position for selectively closing either the right or left turn contacts, the lever having a handle portion extending out of the housing, and a friction-slip gear train for coupling the steering wheel and the lever including a gear mounted for rotation on a fixed axis in the housing and projecting through an opening in the top of the housing for engagement with the steering wheel, and also including an interrupted gear member rotary with the lever in the housing and having an interruption so phased as to uncouple the said gear and the lever when the lever is in neutral position.

12. A directional signal switch for mounting on a vehicle's steering column under the vehicle's steering wheel, comprising a housing having means for attaching it to the column, right and left turn contacts in the housing, a switch-operating lever pivotally mounted in the housing for swinging movement in one direction from a neutral position to a right turn position and in the opposite direction from neutral to a left turn position for selectively closing either the right or left turn contacts, the lever having a handle portion extending out of the housing, and a train of friction gears for coupling the steering wheel and the lever including a friction wheel mounted for rotation on a fixed axis in the housing and projecting through an opening in the top of the housing for engagement with the steering wheel, and also including an interrupted friction gear member rotary with the lever in the housing having an interruption so phased as to uncouple the friction wheel and the lever when the lever is in neutral position.

13. A directional signal switch for mounting on a vehicle's steering column under the vehicle's steering wheel, comprising a housing having means for attaching it to the column, right and left turn contacts in the housing, a switch-operating lever pivotally mounted in the housing for swinging movement in one direction from a neutral position to a right turn position and in the opposite direction from neutral to a left turn position for selectively closing either the right or left turn contacts, the lever having a handle portion extending out of the housing, and a train of friction gears for coupling the steering wheel and the lever including a friction wheel mounted for rotation on a fixed axis in the housing and projecting through an opening in the top of the housing for engagement with the steering wheel, a friction pinion rotary with the friction wheel, and an interrupted friction gear segment carried by the lever in the housing for engagement with the pinion, the gear segment having an interruption so phased as to uncouple the friction wheel and lever when the lever is in neutral position, the pinion and gear segment otherwise being frictionally engaged.

14. A directional signal system as set forth in claim 13 wherein the gear segment is carried by the lever for movement toward and away from the pinion and is biased toward the pinion.

15. A directional signal system as set forth in claim 14, further including means for limiting the movement of the gear segment toward the pinion to determine a position of the gear segment, in the neutral position of the lever, out of contact with the pinion.

16. A directional signal switch for mounting on a vehicle's steering column under the vehicle's steering wheel, comprising a housing having means at one end for attaching it to the column, right and left turn contacts in the housing, a switch-operating lever pivotally mounted at the other end of the housing for swinging movement on an axis substantially parallel to the steering wheel axis when the housing is mounted on thte column, the lever being swingable in one direction from a neutral position to a right turn position to close the right turn contacts and in the other direction from neutral to a left turn position to close the left turn contacts, part of the lever extending from its pivot into the housing and part extending from the pivot out of the housing, a cluster consisting of a friction wheel and a friction pinion mounted in the housing adjacent its said one end for rotation on a fixed axis in the plane corresponding to the neutral position of the lever, said axis being inclined upward in the direction toward the other end of the housing, the friction wheel projecting through an opening in the top of the housing and the pinion being located on the side of the wheel toward the lever, and an interrupted friction gear member carried by the lever within the housing cooperable with the pinion, said gear member comprising a flat ring segment curved on an arc centered in the axis of the lever and having a central depression providing an interruption aligned with the lever.

17. A directional signal switch as set forth in claim 16 wherein the ring segment is mounted on the inner end of the lever for pivotal movement toward and away from the bottom of the pinion and is biased toward the pinion by a spring.

18. A directional signal switch as set forth in claim 17, further including means movable with the ring segment engageable with a fixed stop in the housing for limiting the movement of the ring segment toward the pinion to determine a position of the ring segment, in the neutral position of the lever, out of contact with the pinion.

19. A directional signal switch for mounting on a vehicle's steering column under the vehicle's steering wheel, comprising a housing having means at one end for attaching it to the column, right and left turn contacts in the housing, a switch-operating lever pivotally mounted at the other end of the housing for swinging movement on an axis substantially parallel to the steering wheel axis when the housing is mounted on the column, the lever being swingable in one direction from a neutral position to a right turn position to close the right turn contacts and in the other direction from neutral to a left turn position to close the left turn contacts, part of the lever extending from its pivot into the housing and part extending from the pivot out of the housing, a friction wheel mounted in the housing adjacent its said one end for rotation on a fixed axis and projecting through an opening in the housing for engagement with the steering wheel, and latch means in the housing including a latch member carried by the end of the lever within the housing for latching the lever in right turn position and in left turn position, and means carried by the friction wheel engageable with said latch member for returning the lever to its neutral position upon rotation of the friction wheel by the steering wheel upon return of the steering wheel to neutral position in coming out of a turn.

20. A directional signal switch for mounting on a vehicle's steering column under the vehicle's steering wheel, comprising a housing having means at one end for attaching it to the column, right and left turn contacts in the housing, a switch-operating lever pivotally mounted at the other end of the housing for swinging movement on an axis substantially parallel to the steering wheel axis when the housing is mounted on the column, the lever being swingable in one direction from a neutral position to a right turn position to close the right turn contacts and in the other direction from neutral to a left turn position to close the left turn contacts, part of the lever extending from its pivot into the housing and part extending from the pivot out of the housing, a friction wheel mounted in the housing adjacent its said one end for rotation on a fixed axis in the plane corresponding to the neutral position of the lever, said axis being inclined upward in the direction toward the other end of the housing, the friction wheel projecting through an opening in the housing for engagement with the steering wheel, and latch means in the housing including a latch member carried by the end of the lever within the housing for latching the lever in right turn position and in left turn position, and means carried by the friction wheel engageable with said latch member for returning the lever to its neutral position upon rotation of the friction wheel by the steering wheel upon return of the steering wheel to neutral position in coming out of a turn.

21. A directional signal switch for mounting on a vehicle's steering column under the vehicle's steering wheel, comprising a housing having means at one end for attaching it to the column, a lever pivotally mounted at the other end of the housing for swinging movement on an axis substantially parallel to the steering wheel axis when the housing is mounted on the column, the lever being swingable in one direction from a neutral position to a right turn position, and in the other direction from neutral to a left turn position, part of the lever extending from its pivot into the housing and part extending from the pivot out of the housing, a switch comprising a case having right turn contacts adjacent one end and left turn contacts adjacent its other, said switch further comprising movable contact means actuated by a stud extending upward through a lengthwise slot in the top of the case and movable lengthwise of the case for closing the contacts, the case being mounted crosswise under the inner end of the lever within the housing with the stud extending upward into a longitudinal groove in the bottom of the lever, a friction wheel mounted in the housing adjacent its said one end for rotation on a fixed axis and projecting through an opening in the housing for engagement with the steering wheel, and latch means in the housing including a latch member carried by the end of the lever within the housing for latching the lever in right turn position and in left turn position, and means carried by the friction wheel engageable with said latch member for returning the lever to its neutral position upon rotation of the friction wheel by the steering wheel upon return of the steering wheel to neutral position in coming out of a turn.

22. A directional signal switch for mounting on a vehicle's steering column under the vehicle's steering wheel, comprising a housing having means at one end for attaching it to the column, a lever pivotally mounted at the other end of the housing for swinging movement on an axis substantially parallel to the steering wheel axis when the housing is mounted on the column, the lever being swingable in one direction from a neutral position to a right turn position, and in the other direction from neutral to a left turn position, part of the lever extending from its pivot into the housing and part extending from the pivot out of the housing, a switch comprising a case having right turn contacts adjacent one end and left turn contacts adjacent its other, said switch further comprising movable contact means actuated by a stud extending upward through a lengthwise slot in the top of the case and movable lengthwise of the case for closing the contacts, the case being mounted crosswise under the inner end of the lever within the housing with the stud extending upward into a longitudinal groove in the bottom of the lever, a friction wheel mounted in the housing adjacent its said one end for rotation on a fixed axis in the plane corresponding to the neutral position of the lever, said axis being inclined upward in the direction toward the other end of the housing, the friction wheel projecting through an opening in the housing for engagement with the steering wheel, and latch means in the housing including a latching member carried by the end of the lever within the housing for latching the lever in right turn position and in left turn position, and means carried by the friction wheel engageable with said latch member for returning the lever to its neutral position upon rotation of the friction wheel by the steering wheel upon return of the steering wheel to neutral position in coming out of a turn.

HENRY G. DIBELKA.

REFERENCES CITED

The following references are of record in the file of this patent:

UNITED STATES PATENTS

| Number | Name | Date |
| --- | --- | --- |
| 1,928,315 | Martin | Sept. 26, 1933 |
| 2,035,266 | Everitt | Mar. 24, 1936 |
| 2,207,114 | Bruderick | July 9, 1940 |
| 2,308,108 | Roedding | Jan. 12, 1943 |
| 2,528,115 | Clayton | Oct. 31, 1950 |